United States Patent
Boss et al.

(10) Patent No.: US 10,120,376 B2
(45) Date of Patent: Nov. 6, 2018

(54) RENEWABLE UAV ENERGY VIA BLADE ROTATION

(71) Applicant: INTERNATIONAL BUSINESS MACHINES CORPORATION, Armonk, NY (US)

(72) Inventors: Gregory J. Boss, Saginaw, MI (US); Jeremy R. Fox, Georgetown, TX (US); Andrew R. Jones, Round Rock, TX (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/364,630

(22) Filed: Nov. 30, 2016

(65) Prior Publication Data

US 2018/0150072 A1   May 31, 2018

(51) Int. Cl.
*G05D 1/00* (2006.01)
*B64C 39/02* (2006.01)
(Continued)

(52) U.S. Cl.
CPC ......... *G05D 1/0005* (2013.01); *B64C 39/024* (2013.01); *B64D 27/24* (2013.01);
(Continued)

(58) Field of Classification Search
CPC .......... G05D 1/0005; F03D 9/25; F03D 9/32; F03D 7/0224; F03D 9/002; B64C 39/024;
(Continued)

(56) References Cited

U.S. PATENT DOCUMENTS 6,382,556 B1   5/2002   Pham
7,398,946 B1   7/2008   Marshall
(Continued)

FOREIGN PATENT DOCUMENTS

GB   2514340   11/2014

OTHER PUBLICATIONS

Angrisani et al., "Autonomous recharge of drones through an induction based power transfer system", IEEE, 2015, Accessed Nov. 21, 2016, 6 pages.
(Continued)

*Primary Examiner* — Marthe Y Marc-Coleman
(74) *Attorney, Agent, or Firm* — Brian Restauro; Andrew D. Wright; Roberts Mlotkowski Safran Cole & Calderon, P.C.

(57) ABSTRACT

A computer-implemented method includes: monitoring, by a computer device, a charge level of a battery of an unmanned aerial vehicle (UAV); determining, by the computer device and based on the monitoring, the charge level is less than a threshold level; docking the UAV on a host vehicle; charging the battery using wind-induced rotation of a rotor of the UAV while the UAV is docked on the host vehicle; determining, by the computer device, the UAV is moving away from a destination while the UAV is docked on the host vehicle; and undocking the UAV from the host vehicle based on the determining the UAV is moving away from the destination.

20 Claims, 10 Drawing Sheets

(51) Int. Cl.
  *B64D 27/24* (2006.01)
  *F03D 9/32* (2016.01)
  *G08G 5/00* (2006.01)
  *F03D 7/02* (2006.01)
  *F03D 9/00* (2016.01)
  *F03D 9/25* (2016.01)

(52) U.S. Cl.
  CPC ........... *F03D 7/0224* (2013.01); *F03D 9/002* (2013.01); *F03D 9/25* (2016.05); *F03D 9/32* (2016.05); *G08G 5/0069* (2013.01); *B64C 2201/042* (2013.01); *B64C 2201/108* (2013.01); *F05B 2220/706* (2013.01); *F05B 2240/923* (2013.01)

(58) Field of Classification Search
  CPC ........ B64C 2201/042; B64C 2201/108; B64D 27/24; G08G 5/0069; F05B 2220/706; F05B 2240/923
  USPC ............................. 701/3; 244/6, 190; 703/9.1
  See application file for complete search history.

(56) References Cited

U.S. PATENT DOCUMENTS

| | | | |
|---|---|---|---|
| 9,056,676 B1* | 6/2015 | Wang | B64F 1/00 |
| 9,412,279 B2 | 8/2016 | Kantor et al. | |
| 9,855,658 B2* | 1/2018 | Babu | B25J 9/1666 |
| 2006/0097103 A1 | 5/2006 | Atmur | |
| 2006/0167599 A1* | 7/2006 | Bodin | G08G 5/0069 |
| | | | 701/16 |
| 2012/0298790 A1 | 11/2012 | Bitar | |
| 2015/0336677 A1 | 11/2015 | Smaoui et al. | |
| 2015/0370251 A1* | 12/2015 | Siegel | G05D 1/0027 |
| | | | 701/2 |
| 2016/0031564 A1 | 2/2016 | Yates | |
| 2016/0039541 A1* | 2/2016 | Beardsley | B60L 11/1816 |
| | | | 701/2 |
| 2016/0196756 A1* | 7/2016 | Prakash | B64C 39/024 |
| | | | 701/3 |
| 2016/0250933 A1* | 9/2016 | Kim | B60L 11/182 |
| | | | 320/108 |
| 2016/0257401 A1* | 9/2016 | Buchmueller | B64C 39/024 |
| 2016/0271796 A1* | 9/2016 | Babu | G05D 1/0094 |
| 2017/0160735 A1* | 6/2017 | Mikan | G05D 1/0005 |
| 2017/0225781 A1* | 8/2017 | Almasoud | B64C 39/024 |
| 2017/0344000 A1* | 11/2017 | Krishnamoorthy | G05D 1/0011 |
| 2018/0037322 A1* | 2/2018 | Buchmueller | G08G 5/025 |
| 2018/0050800 A1* | 2/2018 | Boykin | B64C 39/024 |
| 2018/0101173 A1* | 4/2018 | Banerjee | B64C 39/024 |

OTHER PUBLICATIONS

"Fw:Thinking: The Future of Renewable Energy . . . is Coming from Drones?", Fw: Thinking, http://www.fwthinking.com/videos/future-renewable-energy-video.htm, Accessed Nov. 30, 2016, 8 pages.

Press, "Drones embrace green energy properly, no charging pads needed. This recharges in the air!", http://www.suasnews.com/2015/01/drones-embrace-green-energy-properly-no-charging-pads-needed-this-recharges-in-the-air/, Jan. 15, 2015, 5 pages.

Mell et al., "The NIST Definition of Cloud Computing", NIST, Special Publication 800-145, Sep. 2011, 7 pages.

* cited by examiner

RENEWABLE UAV ENERGY VIA BLADE ROTATION

BACKGROUND

The present invention generally relates to unmanned aerial vehicles (UAVs) and, more particularly, to system and method for creating renewable UAV energy via blade rotation.

UAVs (also called drones) are being used for tasks such as aerial delivery of consumer goods. UAVs commonly use a rechargeable battery to provide power that creates a motive force for flying. However, battery power is short lived and limited in nature for smaller UAVs, and energy alternatives are required for prolonged flights. Smaller UAVs have limited range due to the limited battery power and, thus, have limited range for delivering packages. As such, smaller UAVs would benefit from the ability to extend their effective range to accomplish an objective such as package delivery.

SUMMARY

In an aspect of the invention, a computer-implemented method includes: monitoring, by a computer device, a charge level of a battery of an unmanned aerial vehicle (UAV); determining, by the computer device and based on the monitoring, the charge level is less than a threshold level; docking the UAV on a host vehicle; charging the battery using wind-induced rotation of a rotor of the UAV while the UAV is docked on the host vehicle; determining, by the computer device, the UAV is moving away from a destination while the UAV is docked on the host vehicle; and undocking the UAV from the host vehicle based on the determining the UAV is moving away from the destination.

In an aspect of the invention, there is a computer program product that includes a computer readable storage medium having program instructions embodied therewith, the program instructions being executable by a computer device to cause the computer device to: obtain data from a database, the data defining an optimum charging location for an unmanned aerial vehicle (UAV) on a host vehicle; monitor a distance from a current location of the UAV to a destination of the UAV while the UAV is docked on the host vehicle and charging a battery using wind-induced rotation of a rotor of the UAV; determine, based on the monitoring, the UAV is moving away from a destination while the UAV is docked on the host vehicle; and undock the UAV from the host vehicle based on the determining the UAV is moving away from the destination.

In an aspect of the invention, an unmanned aerial vehicle (UAV) system includes: a processor, a computer readable memory, and a computer readable storage medium; a rechargeable battery; a propulsion system comprising a motor and a rotor; a generator configured to recharge the battery using wind-induced rotation of the rotor; and program instructions to determine an optimum blade pitch of the rotor for recharging the battery when the UAV is docked on a moving host vehicle. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
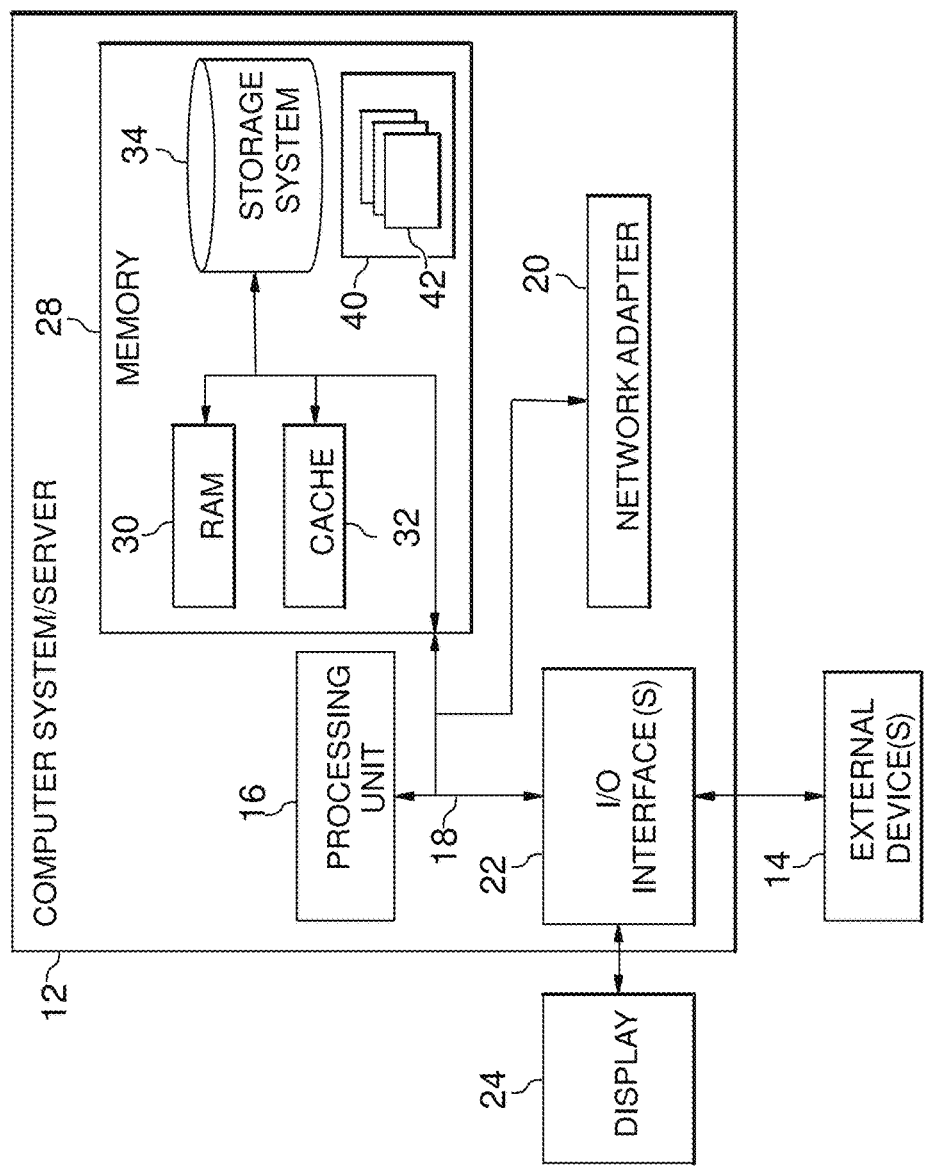
FIG. 1 depicts a cloud computing node according to an embodiment of the present invention.

The present invention generally relates to UAVs and, more particularly, to system and method for creating renewable UAV energy via blade rotation. According to aspects of the invention, a system and method for recharging a UAV includes: determining that a battery level of a UAV is below an ideal battery level threshold; identifying vehicles travelling various routes to which the UAV could affix and take advantage of the wind power to recharge the battery and meet or exceed the ideal battery level threshold; and recommending a vehicle within a reachable distance which is traveling towards the UAV's destination to which the UAV could affix and recharge such that the UAV meets or exceeds the ideal battery level threshold. The identifying the vehicle may be performed by direct communication between the UAV and the vehicles, or by the UAV and vehicles communicating with a central database.

In embodiments, the UAV determines an optimal location on the host vehicle on which to dock. The optimal location may be based on a database defining optimal locations for respective vehicles based on wind tunnel data for the respective vehicles. The optimal location may be based on historical data of UAV recharging efficiency on different locations of the respective vehicles.

In embodiments, the UAV determines an optimal rotor position for recharging the battery while the UAV is docked on the host vehicle. The UAV may include equipment configured to selectively adjust at least one of: rotor tilt position; rotor angular position; and blade pitch. The UAV may be configured to adjust the blade pitch to a number of predefined positions, determine which of the predefined positions provides a highest efficiency of battery charging, and position the blade pitch at the determine highest efficiency position while the UAV is docked on the host vehicle. The UAV may also include a wind direction sensor, such as a wind vane, and may adjust one or more of the rotor tilt position and rotor angular position based on a wind direction determined from the wind direction sensor. In a preferred embodiment, the UAV first adjusts the rotor tilt position and/or rotor angular position based on the determined wind direction, and then subsequently adjusts the blade pitch using the highest efficiency determination.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
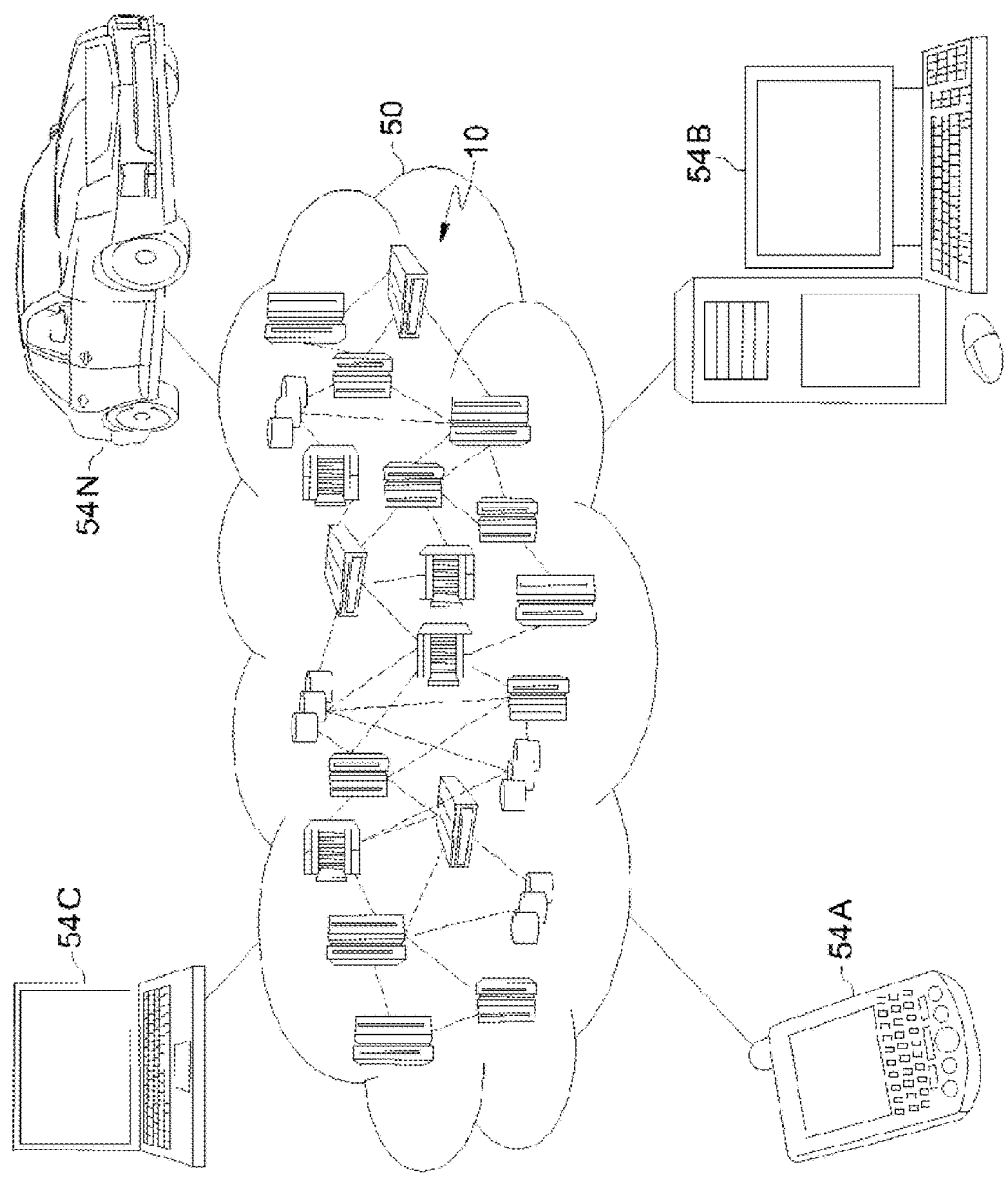
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
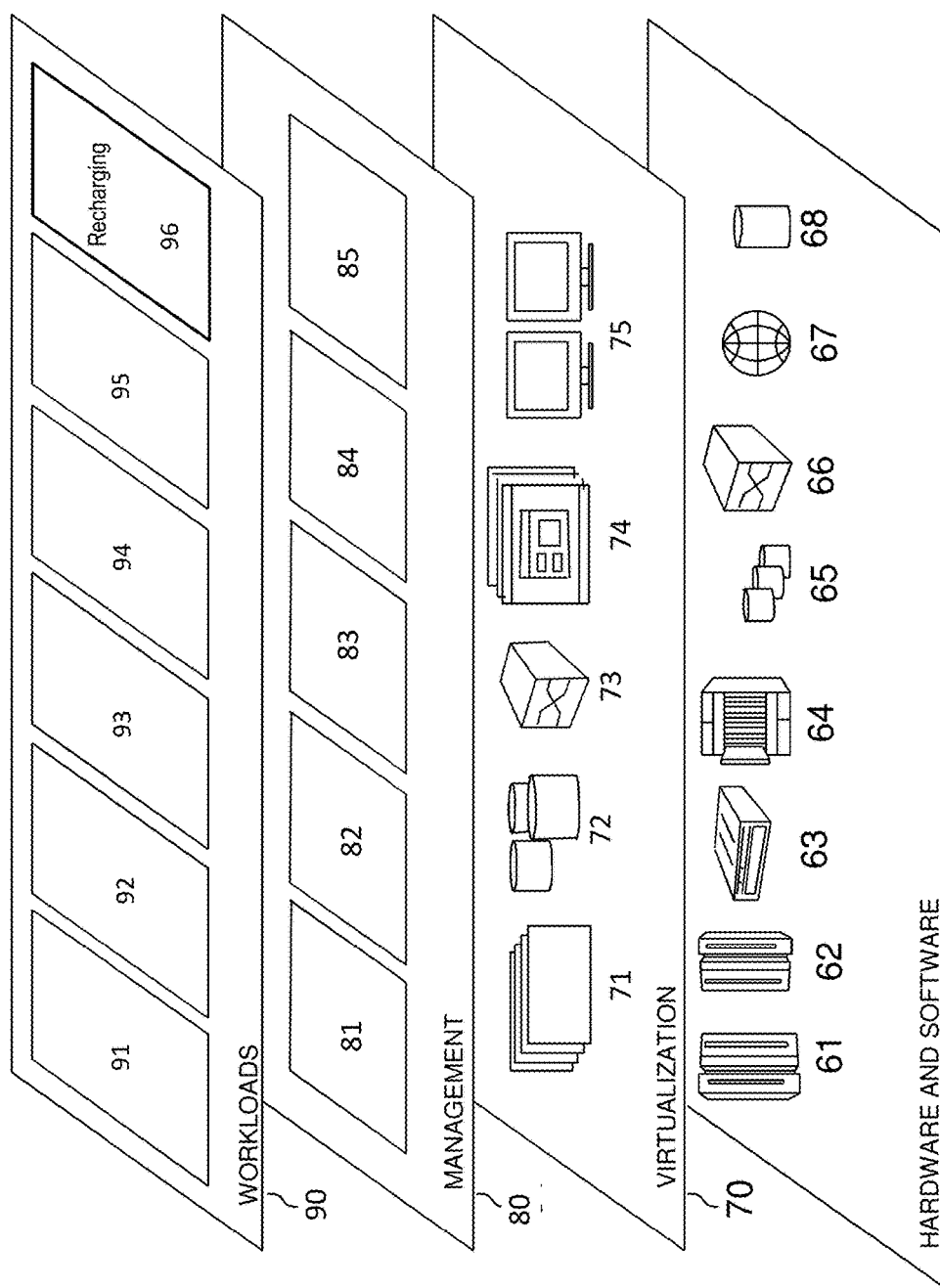
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and recharging 96.

Referring back to FIG. 1, the program/utility 40 may include one or more program modules 42 that generally carry out the functions and/or methodologies of embodiments of the invention as described herein, such as the functionally of recharging 96 of FIG. 3. Specifically, the program modules 42 may receive user information, generate a service list based on the user information, and display user information and selected services for service provider personnel. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be implemented in the environment shown in FIG. 4.

Figure 4:
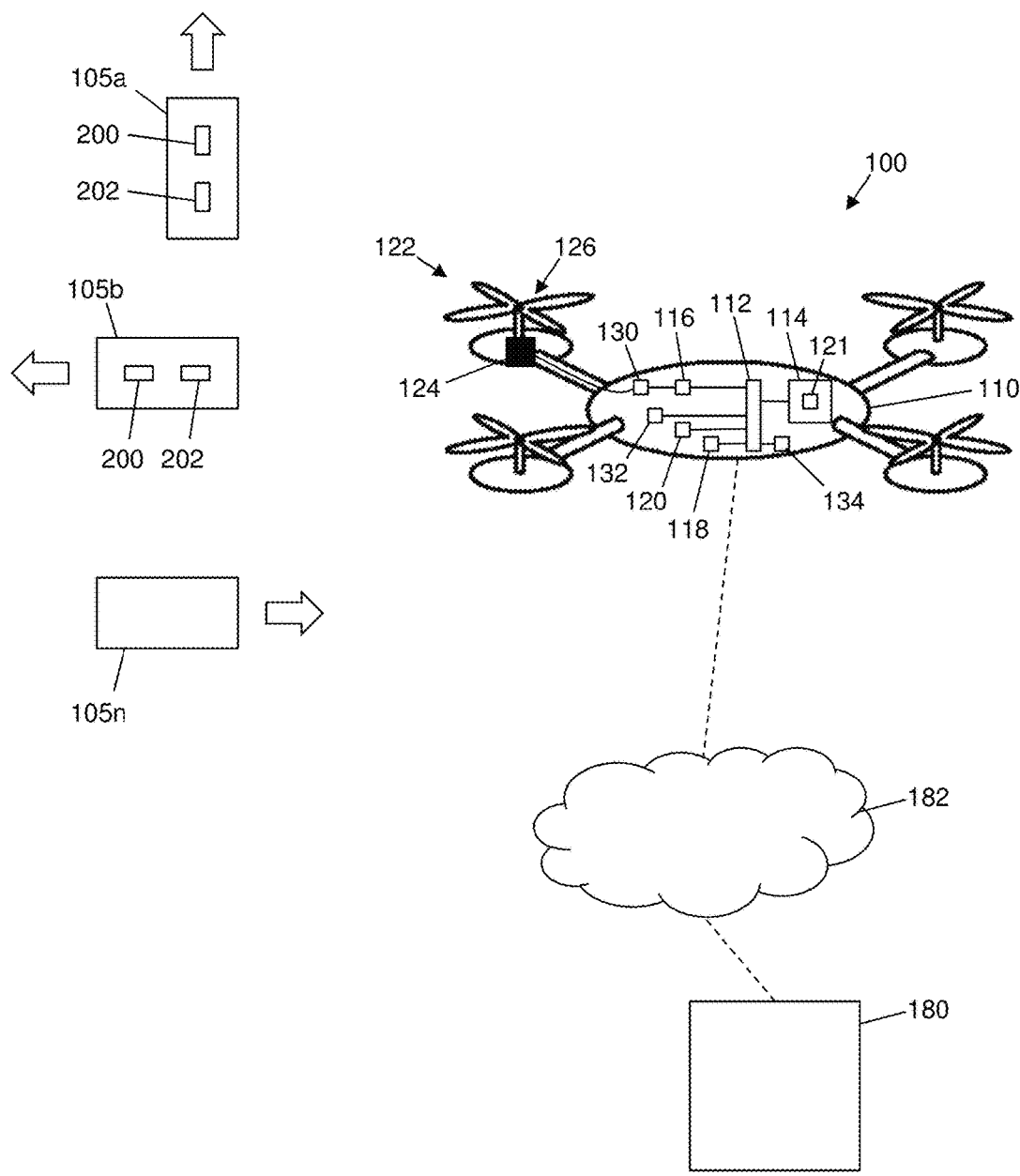
FIG. 4 shows an exemplary environment in accordance with aspects of the present invention.

FIG. 4 shows a block diagram of an exemplary environment in accordance with aspects of the invention. The environment includes a UAV 100 and plural vehicles 105a-n, which may be any suitable vehicles including but not limited to a car, truck, motorcycle, and train. The UAV 100 may include a processor 112, a computer readable memory 114, and a computer readable storage medium, wherein the program instructions are stored on the computer readable storage medium for execution by the processor via the computer readable memory to perform one or more of the functions described herein. In embodiments, the UAV 100 includes a body 110 (or frame, or chassis) carrying the computer processor 112, the memory 114, a rechargeable battery 116, a wireless communication system 118, a location system 120, a propulsion system 122, and a generator 130. The UAV 100 may also include an imaging system 132, such as one or more cameras, and an engagement mechanism 134 as described herein.

The processor 112 is configured to control flight of the UAV 100 based on flight plan data that is stored in the memory 114 and/or received via wireless communication from a remote location. The flight plan data may include a destination of the UAV 100, e.g., a global positioning system (GPS) location to which the UAV 100 intends to fly. The memory 114 may include one or more program modules (e.g., program modules 42 of FIG. 1) that perform functions described herein, including a recharging module 121. The location system 120 is operatively connected to the processor 112 and is configured to determine a GPS location of the UAV 100 using GPS hardware and techniques.

The rechargeable battery 116 is configured to provide electrical power to the components of the UAV 100 and may comprise one or more rechargeable batteries. The wireless communication system 118 may comprise at least one antenna that is configured to provide wireless transmission and reception of communication signals to and from the UAV 100 using any desired protocols such as Bluetooth, WiFi, cellular, etc. The propulsion system 122 is configured to provide a motive force and directional control to the UAV 100 and in embodiments comprises an electric motor 124 that drives a rotor 126. The motor 124 is powered by the battery 116. Aspects of the invention are described with respect to a single motor 124 and single rotor 126, although the propulsion system 122 may also comprise plural motors 124 each driving a respective one of plural rotors 126.

According to aspects of the invention, the generator 130 is operatively connected between the rotor 126 and the battery 116. The generator 130 is configured to convert rotational movement of the rotor 126 into electrical power that is used to recharge the battery 116. When plural rotors 126 are used, the UAV 100 may include plural respective generators 130 operatively connected to respective ones of the plural rotors 126.

In embodiments, the UAV 100 is configured to dock on a moving vehicle (e.g., one of vehicles 105a-n) and eliminate electrical power to the motor 124 such that the motor 124 is no longer driving the rotor 126. In this configuration, the rotor 126 is free to rotate due to wind force across the rotor 126, the wind force being generated by the movement of the vehicle and/or atmospheric wind. The wind-induced rotation of the rotor 126 is converted to electrical power by the generator 130, and this electrical power is used to recharge the battery 116. A first aspect of the invention includes determining a host vehicle, on which to dock the UAV 100, from a plurality of candidate vehicles. A second aspect of the invention includes determining an optimal location of host vehicle on which to dock the UAV 100 for recharging the battery 116. A third aspect of the invention includes adjusting a configuration of the rotor 126, when docked on a host vehicle, to optimize the charging efficiency of the battery 116.

FIG. 4 illustrates a first embodiment of determining a host vehicle from a plurality of vehicles 105a-n. In this embodiment, the UAV 100 communicates directly with candidate vehicles to obtain candidate vehicle route information that is used in determining a host vehicle on which to dock the UAV 100.

As shown in FIG. 4, vehicles 105a, 105b that have opted-in to serving as a host for UAV docking include an indicator 200, which may be a visual indicator (e.g., a predefined decal that is visible by a camera on the UAV 100) or an electronic indicator (e.g., a BLE beacon that emits a signal that is receivable by the wireless communication system 118 of the UAV 100). In embodiments, the UAV 100 determines a set of candidate vehicles (e.g., vehicles 105a, 105b in this example) from the plurality of vehicles 105a-n based on determining which ones of the plurality of vehicles 105a-n include the indicator 200.

According to aspects of the invention, vehicles that have opted-in to serving as a host for UAV docking include a transmitter 202 that broadcasts anonymized vehicle data within a range around the vehicle. The transmitter 202 may be a WiFi transmitter, for example. The anonymized vehicle data that is broadcast may include a visual description of the vehicle (e.g., make, model, color, etc.) and an indication of willingness to act as a host for UAV docking. In embodiments, the UAV 100 receives anonymized vehicle data from all vehicles whose transmission range reaches the UAV 100.

Upon receiving anonymized vehicle data from a respective vehicle (e.g., vehicle 105a), the UAV 100 establishes a direct communication link between the UAV 100 and the vehicle 105a. For example, the anonymized vehicle data that is broadcast by a respective vehicle may include unique address information that permits the UAV 100 to transmit data directly to the respective vehicle using the wireless communication system 118 of the UAV 100. Using the direct communication, the UAV 100 queries the vehicle 105a for its route information, which may include the current location of the vehicle (e.g., GPS location), the vehicle destination (e.g., GPS location), and the route the vehicle intends to travel between its current location and its destination. In embodiments, the UAV 100 may use its current location (e.g., GPS location) and the vehicle route data (e.g., vehicle location and intended route) to determine a distance the UAV 100 must travel to intercept the vehicle. The UAV 100 may also compare its destination (e.g., GPS location) and the vehicle route data (e.g., vehicle intended route and destination) to determine a measure of close the vehicle will travel to the destination of the UAV 100.

In embodiments, the UAV 100 receives route information in this manner from plural candidate vehicles 105*a*, 105*b* and determines an optimal vehicle to select as the host vehicle based on at least one of: the distance the UAV 100 must travel to intercept each respective candidate vehicle 105*a*, 105*b*, and the distance of how close each respective candidate vehicle 105*a*, 105*b* will travel to the destination of the UAV 100. Any suitable logic may be programmed into the recharging module 121 of the UAV 100 for determining an optimal host vehicle from the plural candidate vehicles 105*a*, 105*b*.

In one example of host vehicle selection logic, when the distance to intercept the first vehicle 105*a* exceeds the current range of the UAV 100, and the distance to intercept the second vehicle is within the current range of the UAV 100, the recharging module 121 of the UAV 100 may select the second vehicle 105*b* as the host vehicle based on being able to reach the second vehicle and not being able to reach the first vehicle 105*a*. The UAV 100 may determine its current range (e.g., flying distance) based on its current location and current battery level.

In another example of host vehicle selection logic, when the distance to intercept each vehicle 105*a*, 105*b* is within the current range of the UAV 100 (meaning the UAV 100 can successfully fly to either vehicle), the recharging module 121 of the UAV 100 may select as the host vehicle the one of the candidate vehicles that travels closest to the destination of the UAV 100.

In another example of host vehicle selection logic, the recharging module 121 of the UAV 100 may determine a recharging time associated with each respective candidate vehicle 105*a*, 105*b*, and select the host vehicle as the candidate vehicle that provides the longest recharging time. The recharging time may be determined from the current location of the UAV 100, the destination of the UAV 100, and the vehicle route information. Specifically, the recharging module 121 may determine a time that the UAV 100 will be docked on the candidate vehicle based on a first GPS location where the UAV 100 will dock on the candidate vehicle, a second GPS location where the UAV 100 will undock from the candidate vehicle, and the route and estimated travel speed of the vehicle between the first location and the second location. Alternatively to using recharging time, the recharging module 121 may use the same data to determine the host vehicle based on recharging distance, e.g., the distance the vehicle will travel according to the vehicle route between the first GPS location and the second GPS location.

In another example of host vehicle selection logic, the recharging module 121 of the UAV 100 may determine a time to reach its destination for each respective candidate vehicle 105*a*, 105*b*, and select the host vehicle as the candidate vehicle that provides the shortest time for the UAV 100 to reach its destination. The time to reach its destination may be a combination of: time for the UAV 100 to fly to and dock on the candidate vehicle (based on the distance to intercept the candidate vehicle); time spent by the UAV 100 docked on the candidate vehicle (based on the candidate vehicle route information, and how close the candidate vehicle will travel to the destination of the UAV 100); and time spent by the UAV 100 flying from the candidate vehicle to the destination of the UAV 100 (based on the a location where the UAV 100 will depart from the host vehicle and the destination of the UAV 100). The UAV 100 may determine a respective time to reach its destination for each respective candidate vehicle, and may select as the host vehicle the candidate vehicle that provides the shortest (e.g., least) time for the UAV 100 to reach its destination.

Implementations of the invention are not limited to these examples of host vehicle selection logic, and any suitable logic may be used. The recharging module 121 of the UAV 100 may be programmed to use one host vehicle selection logic over other available host vehicle selection logic based on the current charge of the battery 116 of the UAV 100. For example, when the current charge of the battery 116 is less than a first (e.g., high) threshold level and greater than a second (e.g., medium) threshold level, the recharging module 121 may select the host vehicle based on which of the candidate vehicles travels closest to the destination of the UAV 100, or based on which of the candidate vehicles provides the shortest (e.g., least) time for the UAV 100 to reach its destination, since the battery charge level is of low urgency in this situation. In another example, when the current charge of the battery 116 is less than the second (e.g., medium) threshold level and greater than a third (e.g., low) threshold level, the recharging module 121 may select a host vehicle that provides the longest charging time (or longest charging distance) because battery recharging is of medium urgency under these circumstances. In another example, when the current charge of the battery 116 is less than the third (e.g., low) threshold level, the recharging module 121 may select a host vehicle that provides the shortest distance for the UAV 100 to intercept the host vehicle, since the battery charge level is of high urgency in this situation.

Figure 5:
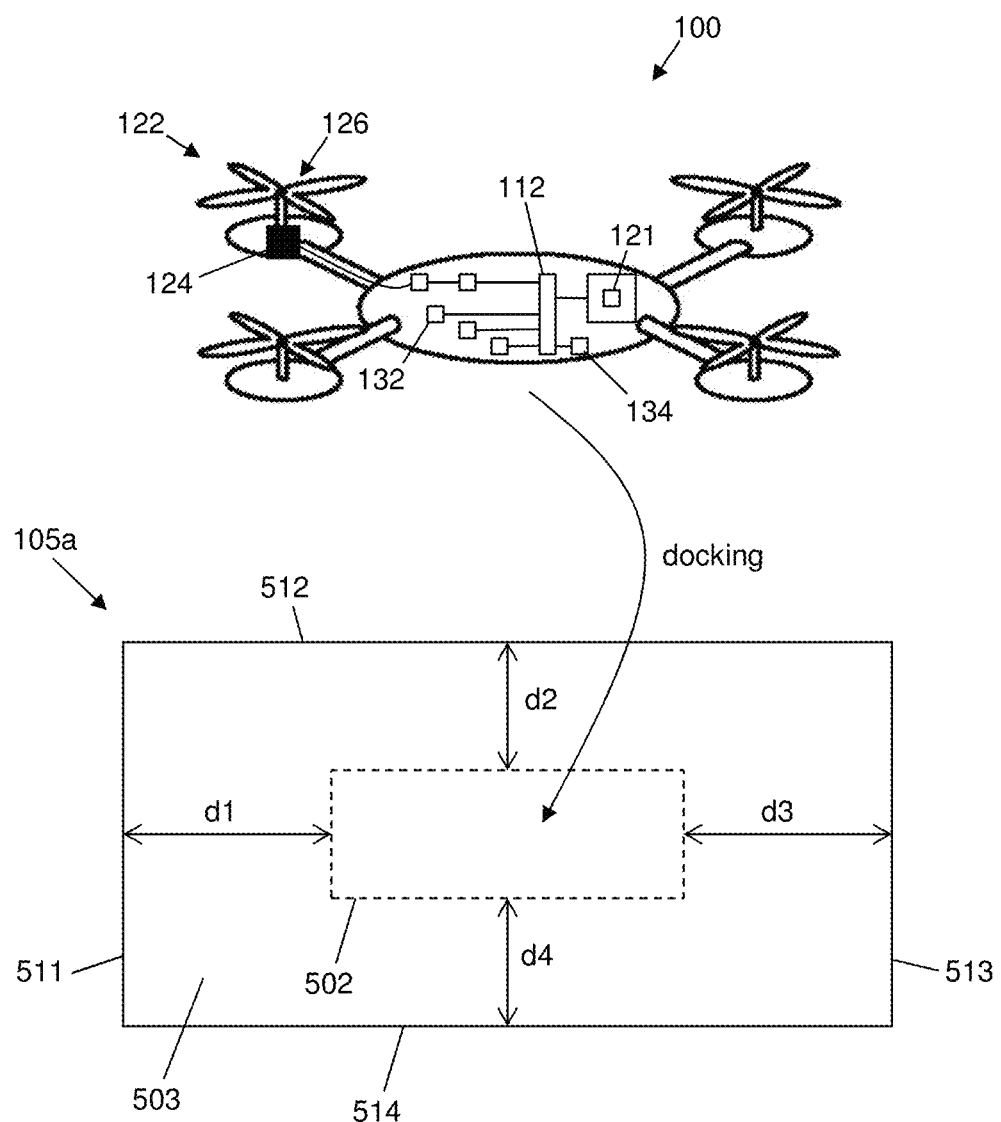
FIG. 5 illustrates a UAV docking on a host vehicle in accordance with aspects of the present invention.

FIG. 5 illustrates the UAV 100 docking at a determined optimum charging location on the host vehicle, e.g., after determining a host vehicle from a plurality of candidate vehicles in the manner described with respect to FIG. 4. According to aspects of the invention, the UAV 100 communicates with a remote database 180 that includes data defining a respective optimum charging location for respective vehicles. The database 180 may be part of, or be accessed by, a computer system/server such as computer system/server 12 of FIG. 1. In a cloud environment, the database 180 and/or the computer system/server may be nodes such as node 10 shown in FIG. 2. The UAV 100 may communicate with the database 180 (or the computer system/server of the database 180) via a network 182.

In embodiments, each vehicle entry in the database 180 includes vehicle characteristics such as make, model, year, etc. Each vehicle entry in the database 180 may also include data defining an optimum charging location for the vehicle. The optimum charging location may be defined as an area of the vehicle, and may be defined relative to edges of the surface of the vehicle that contains the area. For example, in embodiments, the optimum charging location for host vehicle 105*a* may be defined as an area 502 on a surface 503 (e.g., the roof of the vehicle 105*a*). The vehicle entry in the database 180 may define the area using first distance d1 from a first edge 511, a second distance d2 from a second edge 513, a third distance d3 from a third edge 513, and a fourth distance d4 from a fourth edge 514 of the surface 503.

In embodiments, the UAV 100 may use the imaging system 132 (e.g., a camera system) to capture images of the surface 503 as the UAV 100 approaches the vehicle 105*a* for docking. The recharging module 121 may be programmed with image processing techniques, such as edge detection and distance estimation, to detect one or more of the edges 511-514 in the images captured by the imaging system 132, and to estimate relative distances of the UAV 100 to the detected edges 511-514. Based on the estimated relative distances of the UAV 100 to the detected edges 511-514, the processor 112 can control the flight direction of the UAV 100 to fly the UAV 100 onto the area 502, such that the UAV 100 lands on the host vehicle 105a in the area 502 that defines the optimum charging location.

In an embodiment, the data included in the database 180 that defines the optimum charging location on a vehicle is based on wind tunnel test data for the particular type of vehicle. For example, wind tunnel test data may be used to determine a location on a vehicle that provides an optimal airflow for rotating the rotors of a docked UAV. Different types of vehicles may have different optimum charging locations based on the wind tunnel test data. For example, an analysis of wind tunnel text data may reveal that a first type of vehicle has more airflow over the roof, and that a second type of vehicle has the most airflow over the trunk. Using these examples, the database 180 would be populated with data that defines an area on the roof of the first vehicle and an area on the trunk of the second vehicle.

In another embodiment, the data included in the database 180 that defines the optimum charging location on a vehicle is based on historical UAV charging data for the particular type of vehicle. For example, after a UAV docks on a host vehicle and charges its battery, the UAV transmits the following data to the database 180: data defining the vehicle type (e.g., make, model, year of the vehicle); data defining a location where the UAV docked on the vehicle; and data defining a measure of the battery charging that occurred while the UAV was docked on the vehicle in the defined location. The measure of battery charging may be charging efficiency or an amount of charge per unit of time, either of which may be determined by the recharging module 121. Over time, plural UAVs will provide data to the database 180 for charging events that occurred on plural vehicles. The database 180 may analyze plural different data for a same type of vehicle and determine an optimum location for that type of vehicle based on the plural data. For example, the database 180 may receive data from six UAVs that docked on a same type of vehicle (e.g., same make, model, and year), with three of the UAVs having docked on the vehicle roof, two UAVs having docked on the vehicle trunk, and one of the UAVs having docked on the vehicle passenger side. The database 180 may analyze the charging data from each of the six dockings and determine that the vehicle trunk provides the optimum charging location for this type of vehicle. The database 180 stores data defining the optimum charging location for this type of vehicle in the database entry for this vehicle, and provides the data to any UAVs that subsequently request the optimum charging location for this type of vehicle.

According to aspects of the invention, the UAV 100 obtains vehicle type information from the host vehicle 105a (e.g., the host vehicle 105a transmits data to the UAV 100 defining the make, model, and year of the vehicle), and transmits the vehicle type data to the database 180. In this embodiment, the database 180 uses the vehicle type data to look up the optimum charging location for this type of vehicle, and transmits data defining the optimum charging location to the UAV 100. In this embodiment, the UAV 100 uses the data defining the optimum charging location to fly to and land on the host vehicle 105a in the area 502 that corresponds to the optimum charging location.

Figure 6:
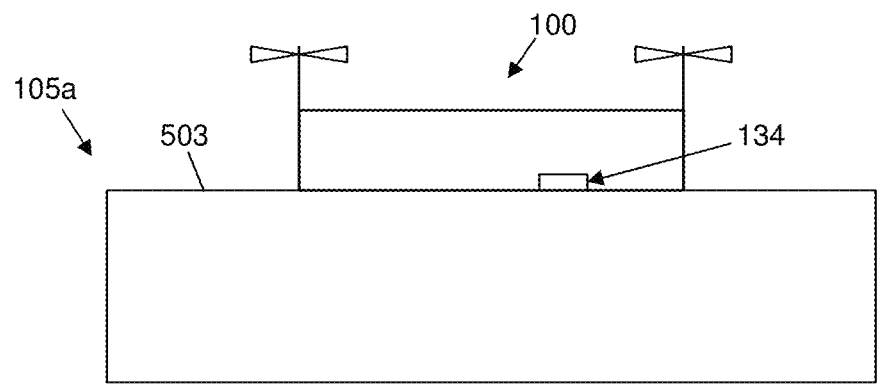
FIG. 6 illustrates a UAV docked on a host vehicle in accordance with aspects of the present invention.

As shown in FIG. 6, the UAV 100 may physically dock to the host vehicle 105a by engaging the host vehicle 105a using an engagement mechanism 134 that physically secures the UAV 100 to a surface 503 of the host vehicle 105a. The engagement mechanism 134 may include one or more magnets, preferably electro-magnets in which a magnetic field is produced by an electric current and the magnetic field disappears when the current is turned off. In this manner, the UAV 100 may selectively turn on and off a magnetic force that engages the UAV 100 to the host vehicle 105a. The engagement mechanism 134 may additionally or alternatively include magnets and/or sensors on the host vehicle 105a that are configured to detect the presence of the UAV 100 and selectively engage the UAV 100 to the host vehicle 105a.

FIGS. 7A-9C illustrate a third aspect of the invention that includes adjusting a configuration of the rotor 126 when docked on a host vehicle to optimize the charging efficiency of the battery 116. In embodiments, the UAV 100 includes one or more actuators and mechanisms that are configured to selectively adjust at least one of: rotor tilt position; rotor angular position; and blade pitch.

Figures 7A, 7B:
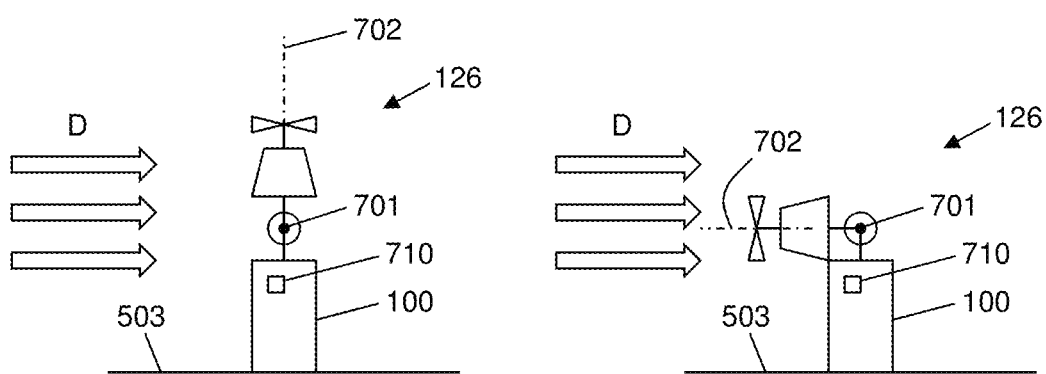
FIGS. 7A and 7B illustrate a first rotor adjustment in accordance with aspects of the present invention.

As shown in FIGS. 7A and 7B, the UAV 100 may be configured to adjust a tilt position of the rotor 126 by rotating the rotor 126 about a first axis 701 that is orthogonal to the axis of rotation 702 of the rotor 126. FIG. 7A shows a side view of the UAV 100 docked to the surface 503 of a host vehicle with the rotor 126 in a first position relative to a wind direction D. FIG. 7B shows a side view of the UAV 100 docked to the surface 503 of the host vehicle with the rotor 126 rotated about the axis 701 from the first position to a second position relative to the wind direction D. In embodiments, an electric actuator may be used to selectively actuate a mechanism (e.g., one or more gears) that rotates the rotor 126 about the axis 701. The UAV 100 may include a sensor such as a wind vane 710 that determines the wind direction relative to the axis 701 The wind vane 710 may be operatively connected to the processor 112, which controls the actuator to adjust the tilt position of the rotor 126 about the axis 701. In this manner, the rotor 126 may be positioned such that the axis of rotation 702 of the rotor 126 is parallel to the wind direction D when viewed from the side.

Figure 8A:
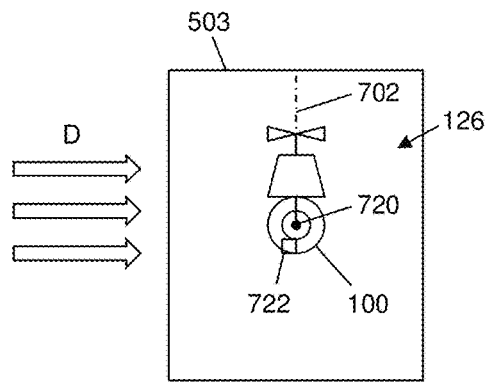
FIGS. 8A and 8B illustrate a second rotor adjustment in accordance with aspects of the present invention.
Figure 8B:
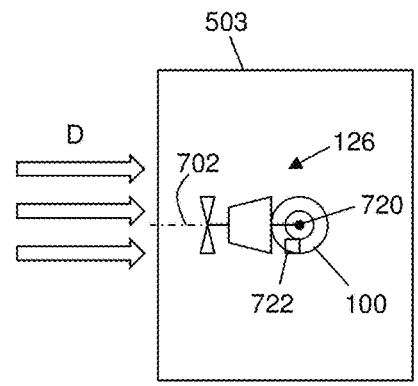

As shown in FIGS. 8A and 8B, the UAV 100 may be configured to adjust an angular position of the rotor 126 about a second axis 720 that is orthogonal to the axis of rotation 702 of the rotor 126. FIG. 8A shows a top-down view of the UAV 100 docked to the surface 503 of a host vehicle with the rotor 126 in a first position relative to a wind direction D. FIG. 8B shows a top-down view of the UAV 100 docked to the surface 503 of the host vehicle with the rotor 126 rotated about the axis 720 from the first position to a second position relative to the wind direction D. In embodiments, an electric actuator may be used to selectively actuate a mechanism (e.g., one or more gears) that rotates the rotor 126 about the axis 720. The UAV 100 may include a sensor such as a wind vane 722 that determines the wind direction relative to the axis 720. The wind vane 722 may be operatively connected to the processor 112, which controls the actuator to adjust the angular position of the rotor 126 about the axis 720. In this manner, the rotor 126 may be positioned such that the axis of rotation 702 of the rotor 126 is parallel to the wind direction D when viewed from the top down.

Figure 9A:
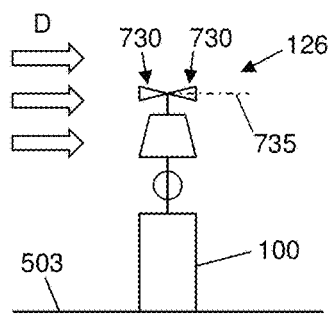
FIGS. 9A, 9B, and 9C illustrate a third rotor adjustment in accordance with aspects of the present invention.
Figure 9B:
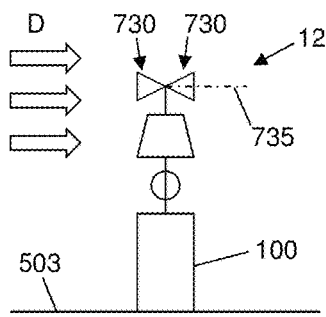
Figure 9C:
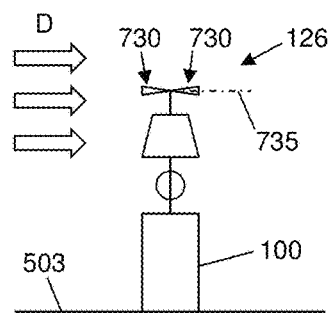

As shown in FIGS. 9A-C, the UAV 100 may be configured to adjust a pitch of the blades 730 of the rotor 126 about a respective radial axis (e.g., axis 735) of each blade. The processor 112 may be configured to adjust the blade pitch to a number of predefined positions, determine which of the predefined positions provides a highest efficiency of battery charging, and position the blade pitch at the determine highest efficiency position while the UAV 100 is docked on the host vehicle. For example, FIG. 9A shows the blades 730 at a first pitch position, FIG. 9B shows the blades 730 at a second pitch position, and FIG. 9C shows the blades 730 at a third pitch position. In embodiments, an electric actuator may be used to selectively actuate a mechanism (e.g., one or more gears) that adjusts the blades 730 to the predefined pitch positions. Although three predefined pitch positions are shown, it is understood that any desired number of predefined pitch positions may be used.

In accordance with aspects of the invention, the processor 112 including the recharging module 121 is configured to adjust the blades 730 to a respective pitch position and measure the amount of energy generated by the generator 130 with the blades 730 at the respective pitch position. The processor 112 repeats this process for all the predefined pitch positions, and determines an optimum one of the pitch positions based on the pitch position that generates the most energy (or the highest recharging efficiency). The processor 112 then adjusts the blades 730 to the determined optimum pitch position and maintains the blades 730 at this position until a subsequent optimum determination process is begun. The processor 112 may be configured to maintain the blades 730 at the determined optimum pitch position for a predefined amount of time (e.g., one minute) before repeating the process of determining an optimum pitch position. Additionally or alternatively, the processor 112 may be configured to maintain the blades at the determined optimum pitch position until the occurrence of a detectable event such as: a change in wind direction beyond a threshold amount as detected by a sensor (e.g., a wind vane), or a change in energy generated by the generator 130 below a threshold level. Additionally or alternatively to determining the optimum position based on amount of energy generated by the generator 130 at each pitch position, the optimum may be determined based on a measured efficiency of charging the battery 116 at each pitch position or a measured wind-induced revolutions per minute of the rotor 126 at each pitch position.

Aspects of the invention may utilize a single adjustment described with respect to FIGS. 7A-B (rotor tilt), FIGS. 8A-B (rotor angular position), and FIGS. 9A-C (rotor blade pitch), or may utilize a combination of successive adjustments. For example, the UAV 100, upon docking on a host vehicle, may be configured to adjust the rotor tilt and subsequently adjust the blade pitch in the manner described herein. Alternatively, UAV 100 may be configured to only adjust the blade pitch upon docking on a host vehicle. In all positions of rotor tile, rotor angle, and blade pitch, the rotor 126 remains operatively connected to the generator 130 (e.g., by one or more gears and/or one or more linkages) such that wind-induced rotation of the rotor 126 may be converted to electrical power by the generator 130.

In accordance with aspects of the invention, the recharging module 121 monitors the current location of the UAV 100 (e.g., using the location system 120) while the UAV 100 is docked on the host vehicle. In embodiments, the recharging module 121 is configured to repeatedly determine a distance between the current location of the UAV 100 and the destination of the UAV 100. The determination can be repeated at any desired iteration interval, such as once per second. The determined distance will decrease from one iteration to the next when the host vehicle, and thus the UAV 100, is moving closer to the UAV destination. The determined distance will increase from one iteration to the next when the host vehicle, and thus the UAV 100, is moving away from the UAV destination.

In embodiments, when the recharging module 121 determines that the UAV 100 is moving away from the UAV destination (i.e., based on the determined distance increasing), the recharging module 121 makes a determination whether to remain docked on the host vehicle. The determination may be based on one or more of: current charge of the battery 116; wind direction and speed; and determined distance from the current location of the UAV 100 and the destination of the UAV 100. For example, the recharging module 121 may be programmed with logic to estimate whether the UAV 100 has enough battery charge to fly to the UAV destination given the combination of factors including the current charge of the battery 116, the wind direction and speed, and the distance to the destination. On the one hand, when the recharging module 121 determines that the UAV 100 is moving away from the UAV destination and the recharging module 121 estimates that the UAV 100 can successfully fly to the destination, then the recharging module 121 may cause the UAV 100 to undock from the host vehicle and fly to the destination. On the other hand, when the recharging module 121 determines that the UAV 100 is moving away from the UAV destination and the recharging module 121 estimates that the UAV 100 cannot successfully fly to the destination, then the recharging module 121 may cause the UAV 100 to remain docked on the host vehicle to continue charging the battery 116.

According to aspects of the invention, after undocking (e.g., disengaging) from the host vehicle the UAV 100 uses its propulsion system flies toward the UAV destination. The UAV 100 continues to monitor the charge level of the battery 116 while flying to the UAV destination. In the event the charge level of the battery 116 drops below a threshold level, the UAV 100 may repeat the process of determining and docking on another host vehicle to recharge the battery 116.

Figure 10:
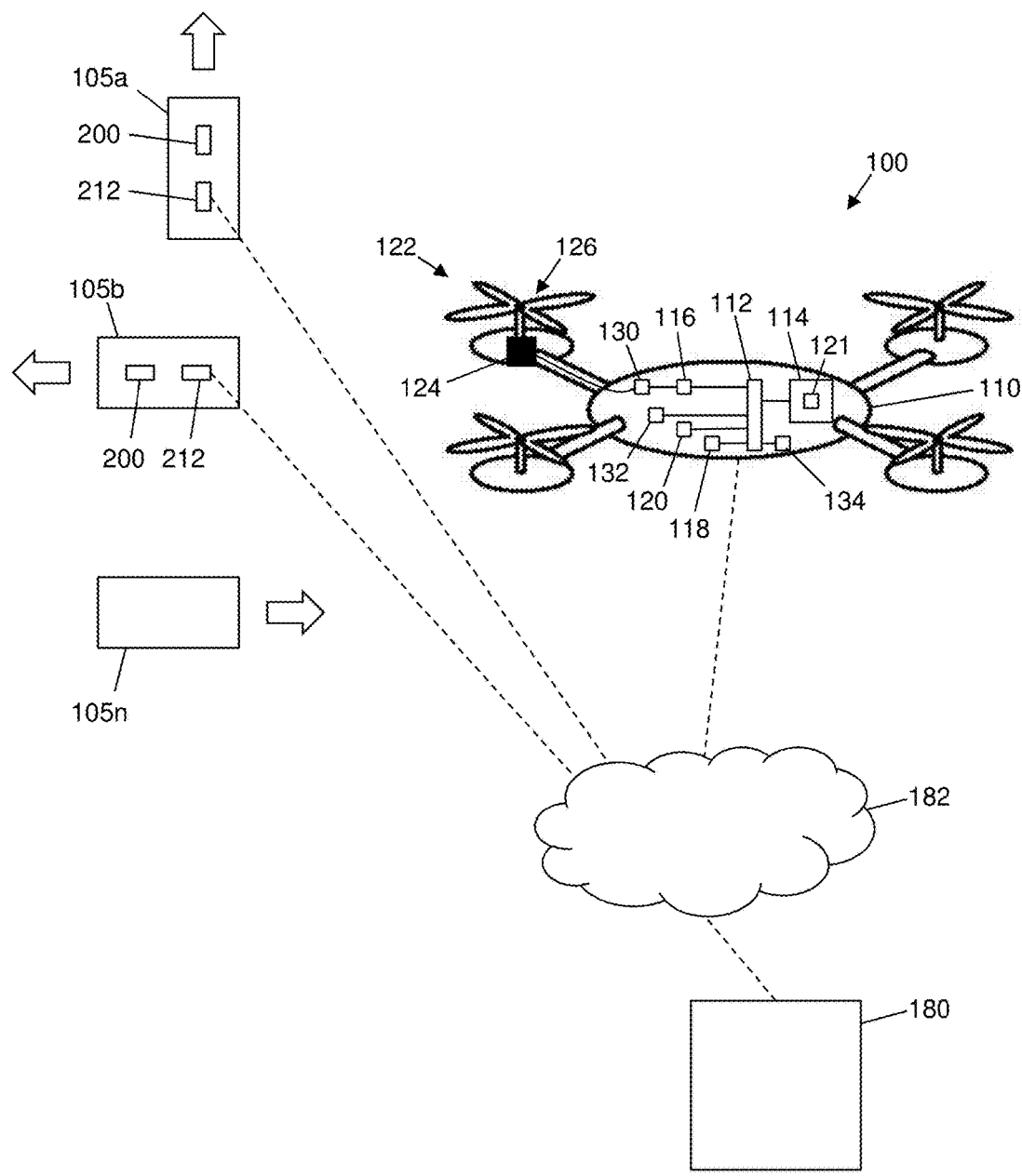
FIG. 10 shows another exemplary environment in accordance with aspects of the present invention.

FIG. 10 shows another exemplary environment in accordance with aspects of the present invention. The environment includes a UAV 100, vehicles 105a-n, database 180, and network 182 similar to those described with respect to FIG. 4. In the embodiment depicted in FIG. 10, vehicles that have opted-in to being a host vehicle (e.g., vehicles 105a and 105b in this example) transmit their route data to the database 180 via the network 182. For example, an onboard computer 212 may transmit the route data from each vehicle 105a, 105b to the database 180. The route information for each vehicle may include vehicle type (e.g., make, model, year, color, etc.), vehicle GPS location, and vehicle route information. The onboard computer 212 may be integrated with the vehicle or may be a user device such as a smartphone.

In the embodiment shown in FIG. 10, the UAV 100 queries the database 180 for candidate vehicles in the vicinity of the UAV 100. For example, the UAV 100 may transmits its current location to the database 180, and the database 180 may return the route information for each candidate vehicle 105a, 105b within a predefined radius of the current location of the UAV 100. The UAV 100 may then use the route information in the same manner as described with respect to FIG. 4 to determine a host vehicle on which to dock, e.g., using appropriate host vehicle selection logic. Upon determining a host vehicle, the UAV 100 may identify the host vehicle on the roadway using any one or more of: a visual description of the vehicle (included in the route information) and image processing of images from the imaging system 132; resolving the current location of the UAV 100 relative to the current location of the host vehicle (received by the UAV 100 from the database 180); and identifying an indicator 200 on the host vehicle using image processing of images from the imaging system 132. Upon identifying the host vehicle on the roadway, the UAV 100 may fly to and dock on the host vehicle in the manner described herein.

In the embodiment illustrated in FIG. 10, there is no direct communication between the candidate vehicles 105a, 105b and the UAV 100. Instead, the candidate vehicles 105a, 105b and the UAV 100 each communicate with the database 180.

Figure 11:
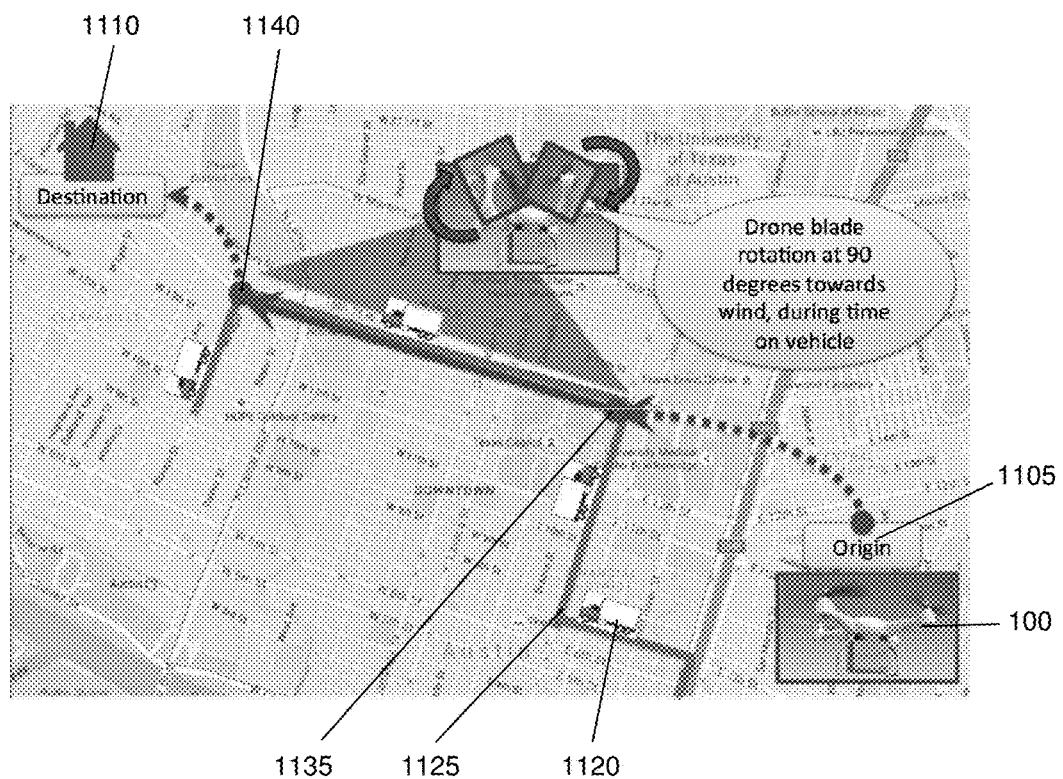
FIG. 11 shows an exemplary use case in accordance with aspects of the present invention.

FIG. 11 shows an exemplary use case in accordance with aspects of the present invention. A shown in FIG. 11, a UAV 100 (e.g., a drone) has flight data that defines an origin 1105 and a destination 1110. The UAV 100 uses techniques described herein to identify a host vehicle 1120 traveling along a route 1125 toward the destination 1110. The UAV 100 docks on the host vehicle 1120 at location 1135 along the route 1125. In embodiments, the UAV 100 docks on the host vehicle 1120 at an optimal area of the host vehicle 1120 based on wind tunnel data or historical docking and charging data. While docked on the host vehicle 1120, the UAV 100 adjusts its rotor(s) using one or more of the adjustments described herein and uses the wind-induced rotation of the rotor(s) to recharge the battery 116. At location 1140, the UAV 100 determines that the distance between the UAV 100 and the destination 1110 begins to increase (e.g., is no longer decreasing), and the UAV 100 makes the determination to undock (e.g., disengage) from the host vehicle 1120 and fly to the destination 1110.

Figure 12:
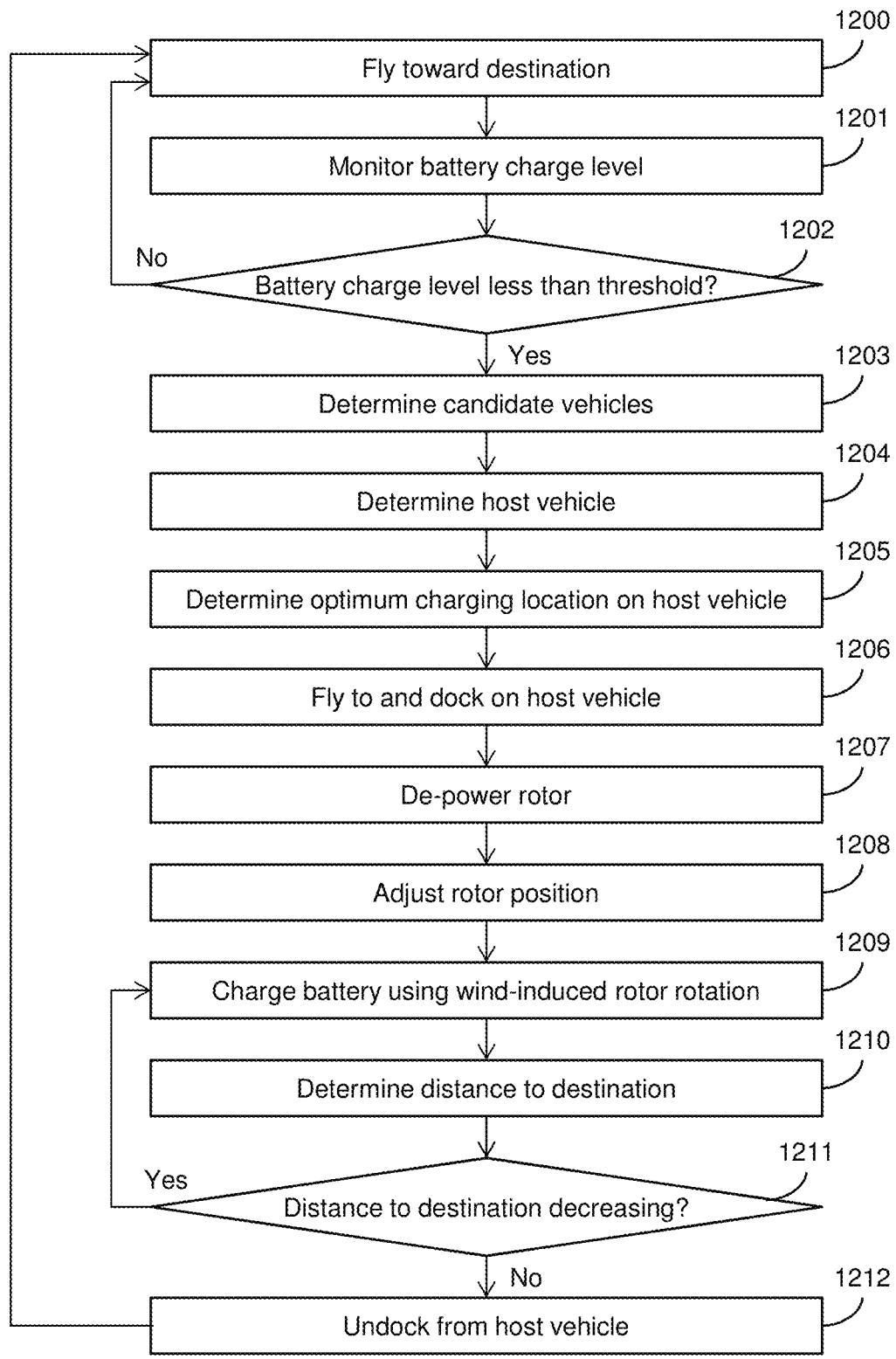
FIG. 12 shows a flowchart of an exemplary method in accordance with aspects of the present invention.

FIG. 12 shows a flowchart of an exemplary method in accordance with aspects of the present invention. The steps of FIG. 12 may be implemented in the environments of FIGS. 4-10, for example, and are described using reference numbers of elements depicted in FIGS. 4-10. As noted above, the flowchart illustrates the architecture, functionality, and operation of possible implementations of systems, methods, and computer program products according to various embodiments of the present invention.

At step 1200, the UAV 100 flies toward its destination. In embodiments, the UAV 100 stores a flight plan in memory 118 or receives data that defines a flight plan. In either event, the flight plan includes data that defines a destination of the UAV, e.g., a GPS location. The UAV 100 uses its propulsion system and navigation system to fly toward the destination.

At step 1201, the recharging module 121 monitors a remaining charge level of the battery 116. The remaining battery level may be determined using techniques such as coulomb counting or impedance measurement.

At step 1202, the recharging module 121 determines whether the remaining charge level of the battery 116 is less than a threshold level. The threshold may be a predefined value, e.g., 20% of the full battery charge level. Alternatively, the threshold may be based on the amount of battery power required to fly the UAV 100 to the destination from step 1200. In the latter case, the recharging module 121 may take wind direction and speed into account when determining an amount of battery power required to fly the UAV 100 to the destination.

In the event the remaining charge level of the battery 116 is not less than the threshold level (i.e., it is greater than the threshold level), then the process returns to step 1200 where the UAV 100 continues to fly toward the destination.

In the event the remaining charge level of the battery 116 is less than the threshold level, then at step 1203 the UAV 100 determines candidate vehicles for docking and recharging. Step 1203 may be performed in the manner described with respect to FIG. 4 or FIG. 10. For example, the UAV 100 may determine candidate vehicles by receiving broadcasts from vehicles as described with respect to FIG. 4. Alternatively, the UAV 100 may query a remote database 180 for the identify of candidate vehicles as described with respect to FIG. 10.

At step 1204, the UAV 100 determines a host vehicle from the candidate vehicles. Step 1204 may be performed in the manner described with respect to FIG. 4, e.g., by receiving route information directly from each of the candidate vehicles and applying one or more host vehicle selection logic routines using the route information. Step 1204 may also be performed in the manner described with respect to FIG. 10, e.g., by receiving route information for each of the candidate vehicles from the database, and applying one or more host vehicle selection logic routines using the route information.

At step 1205, the UAV 100 optionally determines that was determined at step 1204. In embodiments, step 1205 is performed in the manner described with respect to FIGS. 4 and 5, e.g., by obtaining data from the database that defines an area of an optimum charging location on the host vehicle based on the type of the host vehicle and one of wind tunnel test results and historical docking and charging data.

At step 1206, the UAV 100 flies to and docks on the host vehicle that was determined at step 1204. In embodiments, step 1205 is performed in the manner described with respect to FIGS. 4-6, e.g., by the UAV 100 flying to the host vehicle, landing on a surface of the host vehicle, and engaging the host vehicle (e.g., with magnets or other engagement mechanism). If the UAV 100 determined an optimum charging location on the host vehicle at optional step 1205, then step 1206 may include flying to and landing on the host vehicle in the determined optimum charging location, e.g., by using an imaging system of the UAV 100 to identify and fly to area of the optimum charging location on the host vehicle.

At step 1207, the UAV 100 de-powers the rotor. In embodiments, the processor 112 of the UAV 100 turns off the motor that powers the rotor.

At step 1208, the UAV 100 optionally adjusts a position of the rotor. In embodiments, step 1208 includes adjusting at least one of the rotor tilt position (as described at FIGS. 7A-B), the rotor angular position (as described at FIGS. 8A-B), and the blade pitch position (as described at FIGS. 9A-C). Adjusting the rotor position may be performed to optimize the charging that occurs while the UAV 100 is docked on the host vehicle.

At step 1209, the UAV 100 charges the battery 116 using wind-induced rotation of the rotor. As described with respect to FIG. 4, the UAV 100 includes a charging device (e.g., a generator) operatively connected between the rotor and the battery, the charging device being configured to convert wind-induced rotational motion of the rotor to electrical power that is applied to re-charge the battery 116.

At step 1210, the UAV 100 determines a distance from its current location (docked on the host vehicle) to its destination (from step 1200). Step 1210 may be performed in the manner described herein, e.g., by the UAV 100 comparing its current GPS location to the GPS location of the destination.

At step 1211, the UAV 100 determines whether the distance (from step 1210) is increasing or decreasing from one iteration to the next. As described with respect to FIG. 4, the determined distance decreasing from one iteration to the next indicates that the UAV 100 is moving toward its destination, and the process returns to step 1209 and 1210 where the UAV 100 continues charging the battery and begins the next iteration of determining the distance to its destination. As described with respect to FIG. 4, the determined distance increasing from one iteration to the next indicates that the UAV 100 is moving away from its destination, and at step 1212 the UAV 100 undocks from the host vehicle and the process returns to step 1200 where the UAV flies toward its destination and steps 1201 and 1202 where the UAV 100 monitors its battery charge level compared to a threshold.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    monitoring, by a computer device, a charge level of a battery of an unmanned aerial vehicle (UAV);
    determining, by the computer device and based on the monitoring, the charge level is less than a threshold level;
    determining an optimum charging location from a plurality of possible charging locations on a surface of a host vehicle;
    docking the UAV on the optimal charging location of the host vehicle;
    charging the battery using wind-induced rotation of a rotor of the UAV while the UAV is docked on the host vehicle;
    determining, by the computer device, the UAV is moving away from a destination while the UAV is docked on the host vehicle; and
    undocking the UAV from the host vehicle based on the determining the UAV is moving away from the destination.

2. The method of claim 1, further comprising determining the host vehicle from a plurality of candidate vehicles based on determining which of the plurality of candidate vehicles include a visual indicator detectable by a camera of the UAV.

3. The method of claim 1, further comprising:
    determining a plurality of candidate vehicles based on broadcasts received by the computer device from respective ones of the plurality of candidate vehicles; and
    determining the host vehicle from the plurality of candidate vehicles.

4. The method of claim 3, further comprising determining, by the computer device, the host vehicle based on route information received from the respective ones of the plural candidate vehicles.

5. The method of claim 1, further comprising determining a plurality of candidate vehicles by the computer device querying a database.

6. The method of claim 5, further comprising determining, by the computer device, the host vehicle based on route information of the plural candidate vehicles received from the database.

7. The method of claim 1, wherein the optimum charging location is based on one of wind tunnel test results and historical docking and charging data for particular vehicle types.

8. The method of claim 1, further comprising adjusting a position of the rotor while the UAV is docked on the host vehicle, wherein the adjusting the position of the rotor comprises:
    successively adjusting a blade pitch of the rotor to each of a plurality of predefined pitch positions;
    determining an optimum one of the plurality of predefined pitch positions; and
    adjusting the blade pitch to the determined optimum one of the plurality of predefined pitch positions.

9. The method of claim 8, wherein the optimum one of the plurality of predefined pitch positions is determined based on rotational speed of the rotor at each of the plurality of predefined pitch positions.

10. The method of claim 1, further comprising adjusting a position of the rotor while the UAV is docked on the host vehicle, wherein the adjusting the position of the rotor comprises at least one from the group consisting of:
    adjusting rotor tilt position;
    adjusting rotor angular position; and
    adjusting rotor blade pitch.

11. The method of claim 1, further comprising:
    capturing images of the surface of the host vehicle via a camera of the UAV; and
    determining, by the computer device, one or more edges of the surface of the host vehicle from the images,
    wherein the docking the UAV on the optimal charging location of the host vehicle comprises controlling, by the computer device, the landing of the UAV on the optimal charging location based on the one or more edges of the surface of the host vehicle.

12. A computer program product comprising a computer readable storage medium having program instructions embodied therewith, the program instructions executable by a user device to cause the computer device to:
    obtain data from a database, the data defining an optimum charging location on a surface of a host vehicle of a particular vehicle type for charging a battery of an unmanned aerial vehicle (UAV), wherein the charging location is one of multiple possible charging locations on the surface of the host vehicle, and wherein the optimum charging location is determined based on the particular vehicle type;

monitor a distance from a current location of the UAV to a destination of the UAV while the UAV is docked on the host vehicle and charging a battery using wind-induced rotation of a rotor of the UAV;

determine, based on the monitoring, the UAV is moving away from a destination while the UAV is docked on the host vehicle; and undock the UAV from the host vehicle based on the determining the UAV is moving away from the destination.

13. The computer program product of claim 12, wherein the optimum charging location is based on one of wind tunnel test results and historical docking and charging data.

14. The computer program product of claim 12, wherein the program instructions cause the computer device to adjust a position of the rotor while the UAV is docked on the host vehicle.

15. The computer program product of claim 14, wherein the adjusting the position of the rotor comprises:

successively adjusting a blade pitch of the rotor to each of a plurality of predefined pitch positions;

determining an optimum one of the plurality of predefined pitch positions; and adjusting the blade pitch to the determined optimum one of the plurality of predefined pitch positions.

16. The computer program product of claim 12, wherein the program instructions cause the computer device to receive route information of the host vehicle from the host vehicle.

17. The computer program product of claim 12, wherein the program instructions cause the computer device to receive route information of the host vehicle from the database.

18. An unmanned aerial vehicle (UAV) system, comprising:

a processor, a computer readable memory, and a computer readable storage medium;

a rechargeable battery;

a propulsion system comprising a motor and a rotor;

a generator configured to recharge the battery using wind-induced rotation of the rotor;

program instructions to determining an optimum charging location on a surface of a host vehicle to recharge the battery of the UAV, wherein the optimum charging location is selected from a plurality of possible charging locations on the surface of a host vehicle based on a type of the host vehicle; and program instructions to determine an optimum blade pitch of the rotor for recharging the battery when the UAV is docked on the host vehicle, and the host vehicle is in motion, wherein the program instructions are stored on the computer readable storage medium for execution by the processor via the computer readable memory.

19. The UAV system of claim 18, wherein the optimum blade pitch is determined based on:

successively adjusting the blade pitch of the rotor to each of a plurality of predefined pitch positions; and determining a respective wind-induced rotational speed of the rotor at each of the plurality of predefined pitch positions.

20. The UAV system of claim 18, further comprising:

program instructions to capture images of the surface of the host vehicle via a camera of the UAV; and program instructions to land the UAV on the optimal charging location based on one or more edges of the surface of the host vehicle determined from the captured images.

* * * * *